(12) United States Patent
Ichikawa et al.

(10) Patent No.: US 9,073,447 B2
(45) Date of Patent: Jul. 7, 2015

(54) POWER TRANSMITTING DEVICE, VEHICLE, AND CONTACTLESS POWER TRANSFER SYSTEM

(71) Applicants: Shinji Ichikawa, Toyota (JP); Keisuke Inoue, Obu (JP)

(72) Inventors: Shinji Ichikawa, Toyota (JP); Keisuke Inoue, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 13/944,425

(22) Filed: Jul. 17, 2013

(65) Prior Publication Data

US 2014/0074332 A1    Mar. 13, 2014

(30) Foreign Application Priority Data

Sep. 7, 2012   (JP) ................................. 2012-197373

(51) Int. Cl.
*B60L 11/18*   (2006.01)

(52) U.S. Cl.
CPC .......... *B60L 11/1846* (2013.01); *Y02T 10/7005* (2013.01); *B60L 11/182* (2013.01); *B60L 2270/147* (2013.01); *Y02T 90/163* (2013.01); *Y02T 90/169* (2013.01); *Y02T 90/121* (2013.01); *Y02T 90/14* (2013.01); *Y02T 90/128* (2013.01); *Y02T 90/122* (2013.01); *Y04S 30/14* (2013.01)

(58) Field of Classification Search
USPC ......................................................... 701/22
See application file for complete search history.

(56) References Cited

U.S. PATENT DOCUMENTS

| 2009/0021350 | A1* | 1/2009 | Hatta et al. .................... 340/10.1 |
| 2011/0082612 | A1 | 4/2011 | Ichikawa |
| 2011/0187320 | A1 | 8/2011 | Murayama |
| 2011/0213550 | A1* | 9/2011 | Ishizuka ........................ 701/201 |
| 2011/0298422 | A1* | 12/2011 | Failing ........................... 320/109 |
| 2012/0143423 | A1* | 6/2012 | Theisen et al. ................... 701/22 |
| 2013/0038272 | A1 | 2/2013 | Sagata |
| 2013/0057082 | A1 | 3/2013 | Takada et al. |
| 2014/0163751 | A1* | 6/2014 | Davis et al. .................... 700/286 |

FOREIGN PATENT DOCUMENTS

| JP | A 2005-303459 |   | 10/2005 |
| JP | A-2007-019719 |   | 1/2007 |
| JP | 2011147213 A | * | 7/2011 |
| JP | A 2011-160505 |   | 8/2011 |
| JP | A-2011-244533 |   | 12/2011 |
| JP | A 2012-500619 |   | 1/2012 |
| WO | WO 2010/022181 A1 |   | 2/2010 |
| WO | WO 2010/052785 A1 |   | 5/2010 |
| WO | WO 2012/086048 A1 |   | 6/2012 |

* cited by examiner

*Primary Examiner* — Rodney Butler
(74) *Attorney, Agent, or Firm* — Oliff PLC

(57) ABSTRACT

A contactless power transfer system supplies power from a power transmitting device to a vehicle in a contactless manner. The power transmitting device and the vehicle are configured to be capable of exchanging information with each other through radio communication. The vehicle is provided with an RFID tag in which information on the vehicle is stored in advance. The power transmitting device includes an RFID reader that reads out information from the ID tag in a contactless manner. A power transmitting ECU recognizes that the vehicle is a vehicle to be supplied with power from the power transmitting device if vehicle information indicated by information from the ID tag corresponds to vehicle information indicated by information received through radio communication.

13 Claims, 7 Drawing Sheets

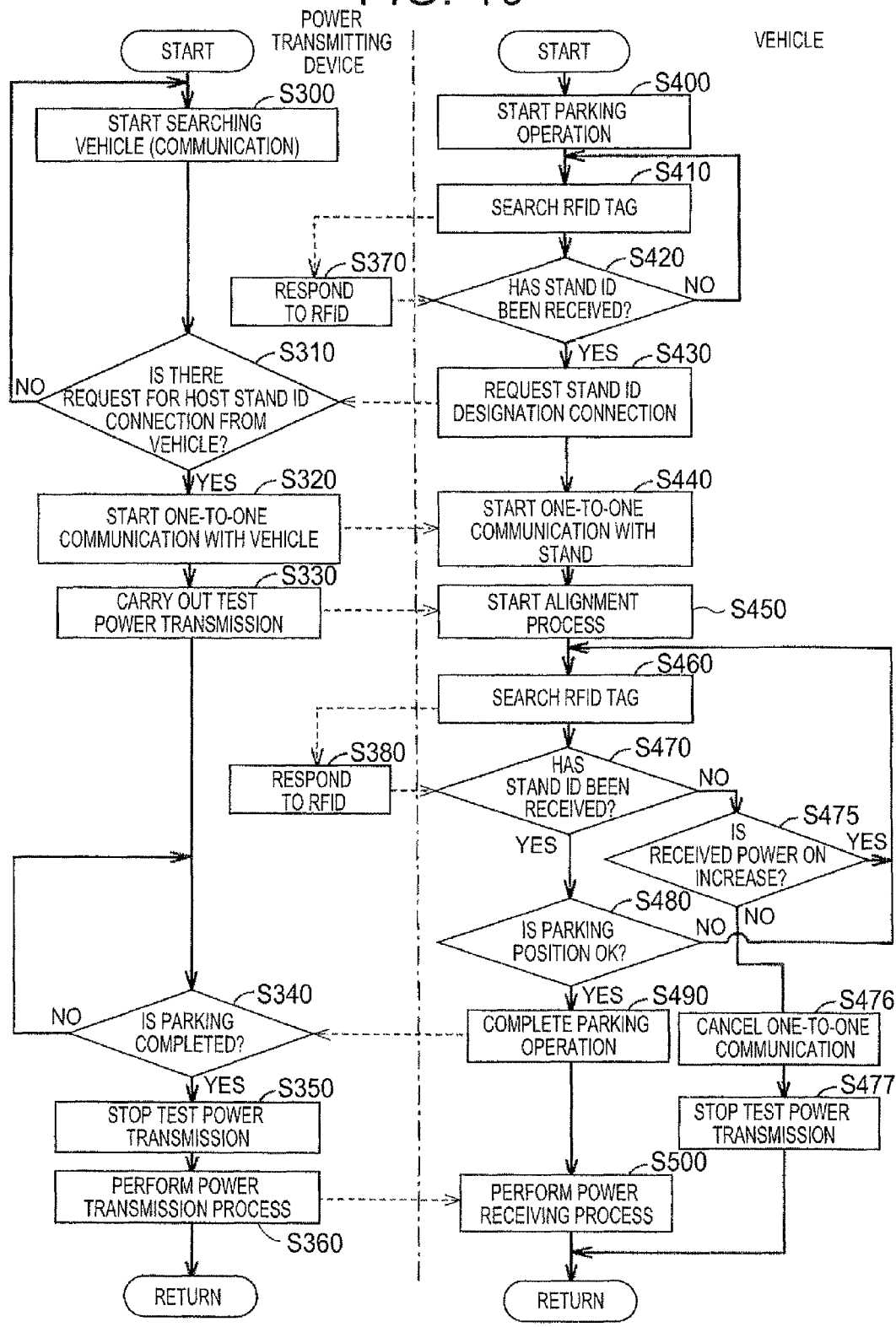

POWER TRANSMITTING DEVICE, VEHICLE, AND CONTACTLESS POWER TRANSFER SYSTEM

INCORPORATION BY REFERENCE

The disclosure of Japanese Patent Application No. 2012-197373 filed on Sep. 7, 2012 including the specification, drawings and abstract is incorporated herein by reference in its entirety.

BACKGROUND OF THE INVENTION

1. Field of the Invention

The invention relates to a power transmitting device, a vehicle, and a contactless power transfer system, and more particularly, to a pairing technology between a power transmitting device and a vehicle in a contactless power transfer system.

2. Description of Related Art

Contactless wireless power transmission that does not use a power cord or a power transmitting cable has recently been drawing attention. It has been proposed to apply this contactless wireless power transfer to an electric vehicle, a hybrid vehicle or the like in which an in-vehicle electrical storage device can be charged by a power supply outside the vehicle (hereinafter referred to also as "an external power supply").

In contactless power transmission, it is necessary to appropriately carry out recognition (pairing) between a power transmitting device and a power receiving device.

According to an art disclosed in Japanese Patent Application Publication No. 2007-19719 (JP-2007-19719 A), in a system that is equipped with a portable terminal device, and an anti-theft portable radio communication unit for recognizing a user of the portable terminal device, it is determined, on the basis of a signal from a radio frequency identification (an RFID) that is provided in the radio communication unit, that the portable terminal device to be recognized is within a specific area.

In a contactless power transfer system that supplies power to a vehicle in a contactless manner, information is exchanged between a vehicle and a power transmitting device through radio communication, and pairing is carried out with parties exchanging power recognized by each other. In such a system, it is necessary to establish communication with a plurality of vehicles or a plurality of power transmitting devices. In general, therefore, radio communication having a relatively wide communicable area is used.

However, in the case where such wide area radio communication is used, pairing may be carried out with a vehicle that is different from a vehicle to be actually supplied with power. In the case where pairing between the vehicle and the power transmitting device is not correctly carried out, the vehicle to be supplied with power may not be appropriately supplied with power from the power transmitting device.

SUMMARY OF THE INVENTION

In view of the above-mentioned problem, the invention provides a power transmitting device, a vehicle, and a contactless power transfer system that appropriately carry out pairing between the power transmitting device and the vehicle in the contactless power transfer system that supplies power from the power transmitting device to the vehicle in a contactless manner.

Thus, according to one aspect of the invention, there is provided a power transmitting device that can supply power to a vehicle in a contactless manner. The power transmitting device is equipped with a power transmitting unit that is configured to supply power to the vehicle in a contactless manner, a readout unit that is configured to read out, in a contactless manner, information stored in advance in an ID tag that is provided in the vehicle, a communication unit that is configured to exchange information with the vehicle through radio communication, and a control device that is configured to control the supply of power to the vehicle. The control device is configured to recognize that the vehicle is a vehicle to be supplied with power from the control device, if vehicle information indicated by information from the ID tag corresponds to vehicle information indicated by information received by the communication unit.

The control device may be configured to refrain from recognizing that the vehicle is a vehicle to be supplied with power, if information is unable to be read out from the ID tag.

The control device may be configured to keep recognizing that the vehicle is a vehicle to be supplied with power, if at least one of a condition that a received power in the vehicle be on the increase and a condition that the received power be equal to or larger than a predetermined level is fulfilled even in a case where information is unable to be read out from the ID tag.

The control device may be configured to keep recognizing that the vehicle is a vehicle to be supplied with power, if at least one of a condition that a distance between the power transmitting unit and the vehicle be on the decrease and a condition that the distance be shorter than a predetermined distance is fulfilled even in a case where information is unable to be read out from the ID tag.

The control device may be configured to keep recognizing that the vehicle is a vehicle to be supplied with power, until a predetermined time elapses even in the case where information is unable to be read out from the ID tag.

A communicable distance between the readout unit and the ID tag may be shorter than a communicable distance of the communication unit based on radio communication.

The control device may be configured to carry out radio communication with a receiving party not specified by the communication unit if the vehicle to be supplied with power is not recognized, and to carry out radio communication with a receiving party specified by the communication unit if the vehicle to be supplied with power is recognized.

The power transmitting device may be configured to supply the vehicle with power less than power that is used to charge an electrical storage device that is mounted on the vehicle so as to support alignment of the vehicle with the power transmitting unit when the vehicle performs a parking operation in which the vehicle is moved to be a position above the power transmitting unit. The vehicle may be configured to make a determination on a position for parking on a basis of a state of power reception from the power transmitting device.

The vehicle may include a power receiving unit that receives power in a contactless manner. A difference between a natural frequency of the power transmitting unit and a natural frequency of the power receiving unit may be equal to or smaller than ±10% of the natural frequency of the power transmitting unit or the natural frequency of the power receiving unit.

The vehicle may include a power receiving unit that receives power in a contactless manner. A coupling coefficient of the power transmitting unit and the power receiving unit may be equal to or smaller than 0.1.

The vehicle may include a power receiving unit that is configured to receive power in a contactless manner. The power receiving unit may be configured to receive power from the power transmitting unit through at least one of a magnetic field that is formed between the power receiving unit and the power transmitting unit and vibrates at a specific frequency, and an electric field that is formed between the power receiving unit and the power transmitting unit and vibrates at a specific frequency.

Besides, according to another aspect of the invention, there is provided a contactless power transfer system that supplies power from a power transmitting device to a vehicle in a contactless manner. This contactless power transfer system is equipped with a control device that is configured to control the supply of power from the power transmitting device to the vehicle. This vehicle includes an ID tag in which information on the vehicle is stored in advance. The power transmitting device includes a readout unit for reading information stored in advance in the ID tag in a contactless manner. The power transmitting device and the vehicle are configured to be capable of exchanging information with each other through radio communication. The control device is configured to recognize that the vehicle is a vehicle to be supplied with power from the power transmitting device, if vehicle information indicated by information from the ID tag corresponds to vehicle information indicated by information received through radio communication.

Besides, according to still another aspect of the invention, there is provided a vehicle that can receive power from a power transmitting device in a contactless manner. The vehicle is equipped with a power receiving unit that is configured to receive power from the power transmitting device in a contactless manner, an electrical storage device that is configured to store power received by the power receiving unit, a readout unit that is configured to read out information stored in advance in an ID tag that is provided in the power transmitting device, a communication unit that is configured to exchange information with the power transmitting device through radio communication, and a control device that is configured to control the charging of the electrical storage device with power received from the power transmitting device. The control device is configured to recognize that the power transmitting device is a power transmitting device to supply power to the vehicle, if information on the power transmitting device which is indicated by information from the ID tag corresponds to information on the power transmitting device which is indicated by information received by the communication unit.

Furthermore, according to still another aspect of the invention, there is provided a contactless power transfer system that supplies power from a power transmitting device to a vehicle in a contactless manner. This contactless power transfer system is equipped with a control device that is configured to control the supply of power from the power transmitting device to the vehicle. The power transmitting device includes an ID tag in which information on the power transmitting device is stored in advance. The vehicle includes a readout unit that is configured to read out, in a contactless manner, information stored in advance in the ID tag. The power transmitting device and the vehicle are configured to be capable of exchanging information with each other through radio communication. The control device is configured to realize that the power transmitting device is a power transmitting device to supply power to the vehicle, if information on the power transmitting device which is indicated by information from the ID tag corresponds to information on the power transmitting device which is indicated by information received through radio communication.

According to the power transmitting device, the vehicle, and the contactless power transfer system as described above, pairing between the power transmitting device and the vehicle can be appropriately carried out in the contactless power transfer system that supplies power from the power transmitting device to the vehicle in a contactless manner.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 10 is a flowchart for illustrating an authentication control process that is performed by a power transmitting device and a vehicle in the foregoing second embodiment of the invention.

DETAILED DESCRIPTION OF EMBODIMENTS

Figure 1:
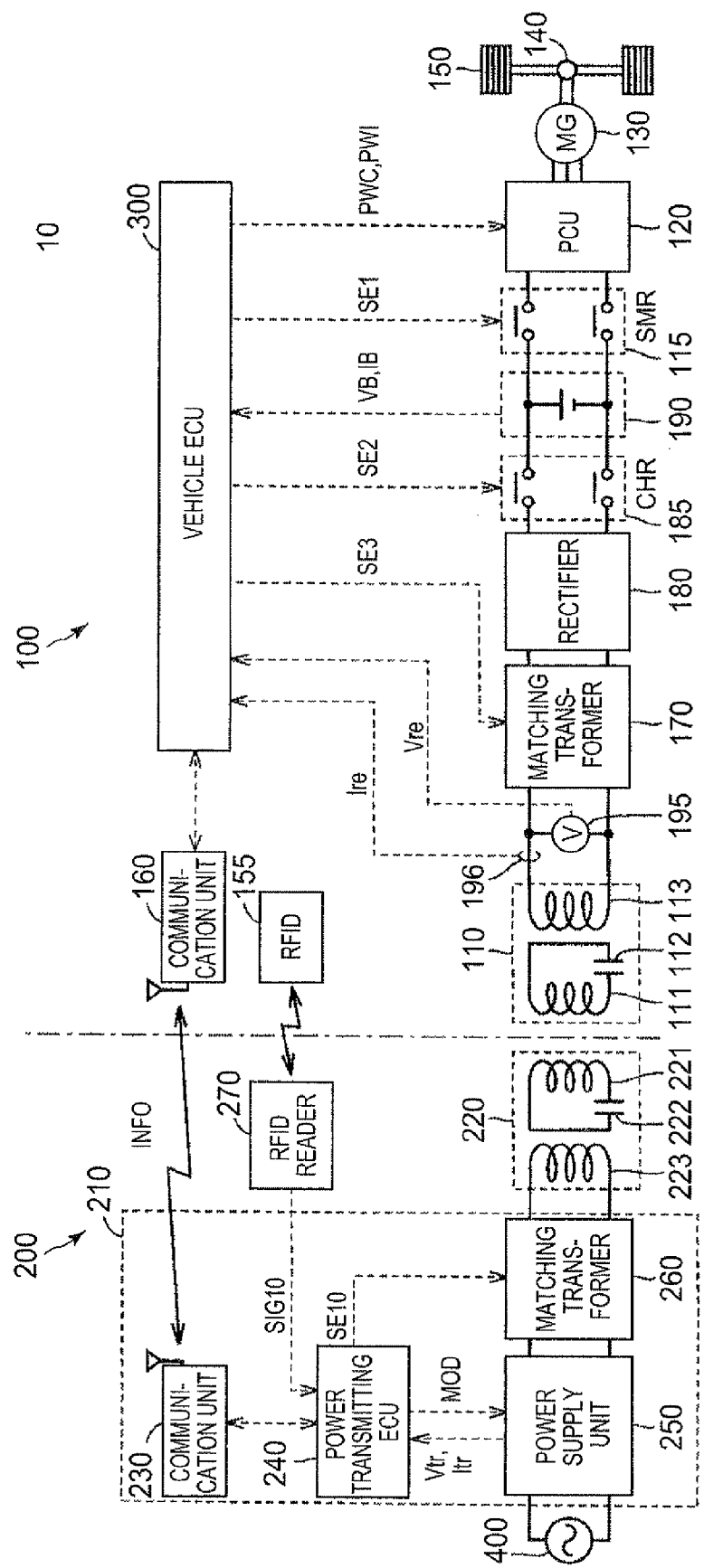
FIG. 1 is an overall block diagram of a contactless power transfer system according to the first embodiment of the invention.

The embodiments of the invention will be described hereinafter in detail with reference to the drawings. Incidentally, like or equivalent components are denoted by like reference symbols respectively in the drawings, and the description thereof will not be repeated.

First of all, the configuration of a contactless power transfer system in the first embodiment of the invention will be described. FIG. 1 is an overall block diagram of a contactless power transfer system 10 according to this embodiment of the invention. Referring to FIG. 1, the contactless power transfer system 10 is equipped with a vehicle 100 and a power transmitting device 200.

The power transmitting device 200 includes a power supply device 210 and a power transmitting unit 220. The power supply device 210 generates an alternating-current power having a predetermined frequency. As an example, the power supply device 210 receives a power from a commercial power supply 400, generates a high-frequency alternating-current power, and supplies the generated alternating-current power to the power transmitting unit 220. Then, the power transmitting unit 220 supplies the power to a power receiving unit 110 of the vehicle 100 in a contactless manner via an electromagnetic field that is generated around the power transmitting unit 220.

The power supply device 210 further includes a communication unit 230, a power transmitting ECU 240 as a control device, a power supply unit 250, and a matching transformer 260. Besides, the power transmitting unit 220 includes a resonant coil 221, a capacitor 222, and an electromagnetic induction coil 223.

The power supply unit 250 is controlled by a control signal MOD from the power transmitting ECU 240, and converts a power received from an alternating-current power supply such as the commercial power supply 400 or the like, into a high-frequency power. Then, the power supply unit 250 supplies the high-frequency power obtained through conversion to the electromagnetic induction coil 223 via the matching transformer 260.

Besides, the power supply unit 250 outputs a power transmitting voltage Vtr and a power transmitting current Itr, which are detected by a voltage sensor (not shown) and a current sensor (not shown) respectively, to the power transmitting ECU 240.

The matching transformer 260 is designed to adjust the input impedance of the power transmitting unit 220, and typically has a circuit that is configured to include a reactor and a capacitor. The impedance adjusted by the matching transformer 260 may be fixed or variable. In the case where the matching transformer 260 is variable, the impedance is adjusted on the basis of a control signal SE10 from the power transmitting ECU 240. Incidentally, the power supply unit 250 may be configured to include the function of the matching transformer 260.

The electromagnetic induction coil 223 can be magnetically coupled to the resonant coil 221 through electromagnetic induction. The electromagnetic induction coil 223 transmits to the resonant coil 221 a high-frequency power supplied from the power supply unit 250, through electromagnetic induction.

The resonant coil 221 transfers the power conveyed from the electromagnetic induction coil 223, to a resonant coil 111 that is included in the power receiving unit 110 of the vehicle 100, in a contactless manner. Incidentally, the transmission of power between the power receiving unit 110 and the power transmitting unit 220 will be described later using FIG. 3.

The communication unit 230 is a communication interface for establishing radio communication between the power transmitting device 200 and the vehicle 100, and exchanges information INFO with a communication unit 160. The communication unit 230 receives vehicle information sent from the communication unit 160 on the vehicle 100 side, a signal commanding the start and stop of power transmission, and the like, and outputs these pieces of received information to the power transmitting ECU 240. Besides, the communication unit 230 sends to the vehicle 100 pieces of information from the power transmitting ECU 240, such as a power transmitting voltage Vtr, a power transmitting current Itr, and the like.

Besides, the power transmitting device 200 further includes an RFID reader 270 as a readout unit for reading out, in a contactless manner, information on a radio frequency identification (RFID) tag 155 (hereinafter also referred to simply as "the RFID") that is provided in the vehicle 100. The RFID reader 270 includes an antenna (not shown), sends power to the RFID 155 of the vehicle 100 through, for example, electromagnetic induction using this antenna, and receives information sent from the RFID 155 in response thereto by the antenna. Communication using the RFID has a shorter communicable distance than communication by the communication unit 230. The RFID reader 270 outputs to the power transmitting ECU 240 information SIG10 that has been received from the RFID 155.

The power transmitting ECU 240 includes a central processing unit (a CPU) (not shown in FIG. 1), a storage device (not shown in FIG. 1), and input/output buffers (not shown in FIG. 1), inputs thereto signals from respective sensors and the like, outputs control signals to respective instruments, and controls the respective instruments in the power supply device 210. Incidentally, the control of these instruments can be performed by a dedicated piece of hardware (an electronic circuit) as well as a piece of software.

In addition to the aforementioned RFID 155, the vehicle 100 includes the power receiving unit 110, a matching transformer 170, a rectifier 180, a charge relay CHR 185, an electrical storage device 190, a system main relay (an SMR) 115, a power control unit (a PCU) 120, a motor-generator 130, a motive power transmission gear 140, driving wheels 150, a vehicle electronic control unit (a vehicle ECU) 300 as a control device, the communication unit 160, a voltage sensor 195, and a current sensor 196. The power receiving unit 110 includes the resonant coil 111, a capacitor 112, and an electromagnetic induction coil 113.

Besides, in this embodiment of the invention, an electric vehicle will be described as an example of the vehicle 100. However, the configuration of the vehicle 100 is not limited to this electric vehicle as long as the vehicle can run using the power stored in the electric storage device. Other examples of the vehicle 100 include a hybrid vehicle that is mounted with an engine, a fuel cell-powered vehicle that is mounted with a fuel cell, and the like.

The resonant coil 111 receives, in a contactless manner, power from the resonant coil 221 included in the power transmitting device 200.

The electromagnetic induction coil 113 can be magnetically coupled to the resonant coil 111 through electromagnetic induction. This electromagnetic induction coil 113 fetches, through electromagnetic induction, a power received by the resonant coil 111, and outputs the power to the rectifier 180 via the matching transformer 170.

The matching transformer 170 is designed to adjust the input impedance of a load that supplies the power received by the resonant coil 111, and has a circuit that includes, for example, a capacitor and a reactor as is the case with the matching transformer 260 on the power transmitting side.

The rectifier 180 rectifies an alternating-current power received from the electromagnetic coil 113 via the matching transformer 170, and outputs the rectified direct-current power to the electrical storage device 190. The rectifier 180 can adopt, for example, a static circuit configuration that includes a diode bridge (not shown) and a smoothing capacitor (not shown). A so-called switching regulator that carries out rectification through the use of switching control can also be employed as the rectifier 180. In the case where the rectifier 180 is included in the power receiving unit 110, it is more preferable to employ a static rectifier such as a diode bridge, in order to prevent the malfunction or the like of a switching element as a result of a generated electromagnetic field.

The CHR 185 is electrically connected between the rectifier 180 and the electrical storage device 190. The CHR 185 is controlled by a control signal SE2 from the vehicle ECU 300, and makes a changeover between the supply and shutoff of power from the rectifier 180 to the electrical storage device 190.

The electrical storage device 190 is a power storage element that is configured to be chargeable/dischargeable. The electrical storage device 190 is configured to include, for example, a secondary battery such as a lithium-ion battery, a nickel hydride battery, a lead storage battery or the like, and an electrical storage element such as an electric double layer capacitor or the like.

The electrical storage device 190 is connected to the rectifier 180. Then, the electrical storage device 190 stores a power that has been received by the power receiving unit 110 and rectified by the rectifier 180. Besides, the electrical storage device 190 is also connected to the PCU 120 via the SMR 115. The electrical storage device 190 supplies to the PCU 120 a power for generating a vehicle driving force. Furthermore, the electrical storage device 190 stores a power generated by the motor-generator 130. The output of the electrical storage device 190 is, for example, about 200 V.

The electrical storage device 190 is provided with a voltage sensor (not shown) for detecting a voltage VB of the electrical storage device 190, and a current sensor (not shown) for detecting an input/output current IB. The values detected by these sensors are output to the vehicle ECU 300. The vehicle ECU 300 calculates a charge state (referred to also as a state of change (an SOC)) of the electrical storage device 190 on the basis of this voltage VB and this current IB.

The SMR 115 is electrically connected between the electrical storage device 190 and the PCU 120. Then, the SMR 115 is controlled by a control signal SE1 from the vehicle ECU 300, and makes a changeover between the supply and shutoff of power between the electrical storage device 190 and the PCU 120.

The PCU 120 includes a converter (not shown) and an inverter (not shown). The converter is controlled by a control signal PWC from the vehicle ECU 300, and converts a voltage from the electrical storage device 190. The inverter is controlled by a control signal PWI from the vehicle ECU 300, and drives the motor-generator 130 through the use of a power obtained as a result of conversion by the converter.

The motor-generator 130 is an alternating-current rotating electrical machine, for example, a permanent magnet-type synchronous motor that is equipped with a rotor in which a permanent magnet is embedded.

An output torque of the motor-generator 130 is transmitted to the driving wheels 150 via the motive power transmission gear 140. The vehicle 100 runs using this torque. During regenerative braking operation of the vehicle 100, the motor-generator 130 can generate a power due to a turning force of the driving wheels 150. Then, the generated power is converted to a power for charging the electrical storage device 190 by the PCU 120.

Besides, in a hybrid vehicle that is mounted with an engine (not shown) as well as the motor-generator 130, the engine and the motor-generator 130 are caused to operate in a cooperative manner, whereby a required vehicle driving force is generated. In this case, the electrical storage device 190 can also be charged using a power that is generated through rotation of the engine.

The communication unit 160 is a communication interface for establishing radio communication between the vehicle 100 and the power transmitting device 200, and exchanges the information INFO with the communication unit 230 of the power transmitting device 200. The information INFO that is output from the communication unit 160 to the power transmitting device 200 includes vehicle information from the vehicle ECU 300, a signal commanding the start and stop of power transmission, and the like.

The RFID 155 includes an antenna (not shown) and a storage unit (not shown) in which vehicle information is stored in advance. When a power is supplied to the RFID 155 from the RFID reader 270 of the power transmitting device 200 through the antenna, the RFID 155 sends the information stored in the storage unit through the antenna. The RFID 155 is arranged on, for example, an outer surface of the vehicle 100. Incidentally, only the single RFID 155 may be provided, or a plurality of RFID's 155 may be provided. In the case where the plurality of the RFID's 155 are provided, it is preferable to arrange the plurality of the RFID's 155 at mutually different positions, for example, a front end face, a rear end face, a lateral face and the like of the vehicle 100.

The vehicle ECU 300 includes a CPU (not shown in FIG. 1), a storage device (not shown in FIG. 1), and input/output buffers (not shown in FIG. 1), inputs signals thereto from the respective sensors and the like, outputs control signals to the respective instruments, and controls the respective instruments in the vehicle 100. Incidentally, these instruments can also be performed by a dedicated piece of hardware (an electronic circuit) as well as a piece of software.

The voltage sensor 195 is connected in parallel to the electromagnetic induction coil 113, and detects a received voltage Vre that has been received by the power receiving unit 110. The current sensor 196 is provided on a power line that links the electromagnetic induction coil 113 and the matching transformer 170 with each other, and detects a received current Ire. Detected values of the received voltage Vre and the received current Ire are sent to the vehicle ECU 300, and are used for calculation of a power transfer efficiency or the like.

Incidentally, as shown in FIG. 1, the power receiving unit 110 and the power transmitting unit 220 are configured to be provided with the electromagnetic induction coils 113 and 223 respectively. However, it is also possible to adopt a configuration in which no electromagnetic induction coil is provided as is the case with a power receiving unit 110A and a power transmitting unit 220A in a contactless power transfer system 10A of FIG. 2. In this case, a resonant coil 221A is connected to the power supply unit 250 via the matching transformer 260 in the power transmitting unit 220A, and a resonant coil 111A is connected to the rectifier 180 via the matching transformer 170 in the power receiving unit 110.

Figure 2:
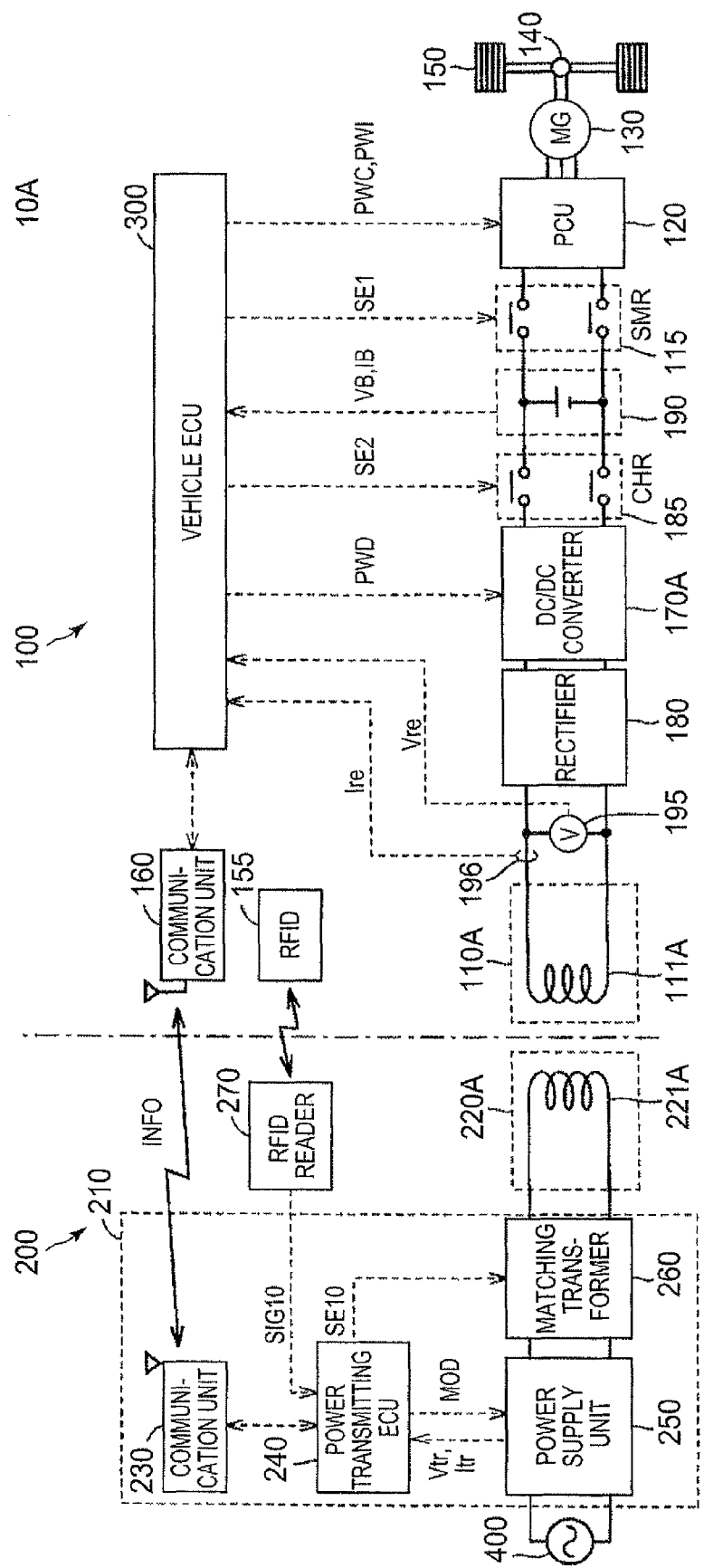
FIG. 2 is an overall block diagram of another example of the contactless power transfer system according to the foregoing first embodiment of the invention.

Besides, as shown in FIG. 2, it is also appropriate to adopt a configuration in which a DC/DC converter 170A that carries out voltage conversion of a direct-current voltage rectified by the rectifier 180 is provided, instead of the matching transformer 170 in FIG. 1, as impedance adjustment means in the vehicle.

Figure 3:
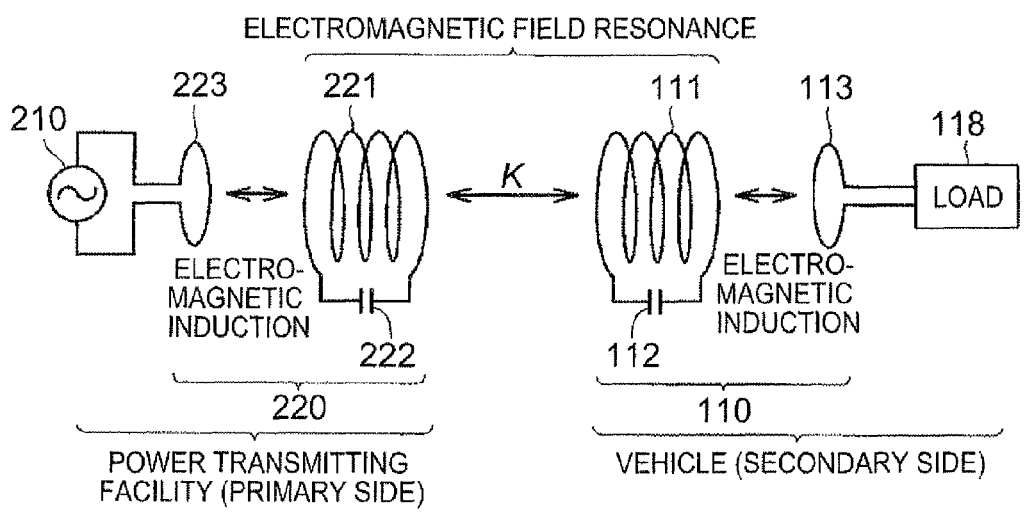
FIG. 3 is an equivalent circuit diagram at the time of power transmission from a power transmitting device to a vehicle in the contactless power transfer system according to the foregoing first embodiment of the invention.

Next, the principle of power transmission will be described. FIG. 3 is an equivalent circuit diagram at the time of power transmission from the power transmitting device 200 to the vehicle 100. Referring to FIG. 3, the power transmitting unit 220 of the power transmitting device 200 includes the resonant coil 221, the capacitor 222, and the electromagnetic induction coil 223.

The electromagnetic induction coil 223 is provided, for example, substantially coaxially with the resonant coil 221, at a predetermined distance from the resonant coil 221. The electromagnetic induction coil 223 is magnetically coupled to the resonant coil 221 through electromagnetic induction, and supplies to the resonant coil 221 a high-frequency power supplied from the power supply device 210, through electromagnetic induction.

The resonant coil 221 forms an LC resonant circuit together with the capacitor 222. Incidentally, as will be described later, an LC resonant circuit is formed in the power receiving unit 110 of the vehicle 100 as well. The difference between the natural frequency of an LC resonant circuit that is formed by the resonant coil 221 and the capacitor 222 and the natural frequency of the LC resonant circuit of the power receiving unit 110 is equal to or smaller than ±10% of the former natural frequency or the latter natural frequency. Then, the resonant coil 221 receives a power from the electromagnetic induction coil 223 through electromagnetic induction, and transmits the power to the power receiving unit 110 of the vehicle 100 in a contactless manner.

Incidentally, the electromagnetic induction coil 223 is provided to facilitate the transfer of power from the power supply device 210 to the resonant coil 221. The power supply device 210 may also be directly connected to the resonant coil 221 without providing the electromagnetic induction coil 223. Besides, the capacitor 222 is provided to adjust the natural frequency of the resonant circuit. In the case where a desired natural frequency is obtained through the use of a stray capacitance of the resonant coil 221, it is also appropriate to adopt a configuration in which the capacitor 222 is not provided.

The power receiving unit 110 of the vehicle 100 includes the resonant coil 111, the capacitor 112, and the electromagnetic induction coil 113. The resonant coil 111 forms an LC resonant circuit together with the capacitor 112. As described above, the difference between the natural frequency of the LC resonant circuit that is formed by the resonant coil 111 and the capacitor 112 and the natural frequency of the LC resonant circuit that is formed by the resonant coil 221 and the capacitor 222 in the power transmitting unit 220 of the power transmitting device 200 is equal to or smaller than ±10% of the former natural frequency or the latter natural frequency. Then, the resonant coil 111 receives a power from the power transmitting unit 220 of the power transmitting device 200 in a contactless manner.

The electromagnetic induction coil 113 is provided, for example, substantially coaxially with the resonant coil 111 at a predetermined distance from the resonant coil 111. The electromagnetic induction coil 113 is magnetically coupled to the resonant coil 111 through electromagnetic induction, fetches a power received by the resonant coil 111 through electromagnetic induction, and outputs the power to an electric load device 118. Incidentally, the electric load device 118 is an electric instrument that utilizes a power received by the power receiving unit 110, and more specifically, comprehensively represents electric instruments starting from the rectifier 180 (FIG. 2).

Incidentally, the electromagnetic induction coil 113 is provided to facilitate the fetching of power from the resonant coil 111. The rectifier 180 may also be. directly connected to the resonant coil 111 without providing the electromagnetic induction coil 113. Besides, the capacitor 112 is provided to adjust the natural frequency of the resonant circuit. In the case where a desired natural frequency is obtained through the use of a stray capacitance of the resonant coil 111, it is also appropriate to adopt a configuration in which the capacitor 112 is not provided.

In the power transmitting device 200, a high-frequency alternating-current power is supplied from the power supply device 210 to the electromagnetic induction coil 223, and the power is supplied to the resonant coil 221 using the electromagnetic induction coil 223. Then, an energy (a power) moves from the resonant coil 221 to the resonant coil 111 through a magnetic field that is formed between the resonant coil 221 and the resonant coil 111 of the vehicle 100. The energy (the power) that has moved to the resonant coil 111 is fetched using the electromagnetic induction coil 113, and is transmitted to the electric load device 118 of the vehicle 100.

As described above, in this power transfer system, the difference between the natural frequency of the power transmitting unit 220 of the power transmitting device 200 and the natural frequency of the power receiving unit 110 of the vehicle 100 is equal to or smaller than ±10% of the natural frequency of the power transmitting unit 220 or the natural frequency of the power receiving unit 110. By setting the natural frequencies of the power transmitting unit 220 and the power receiving unit 110 within such a range, the efficiency of power transmission can be enhanced. On the other hand, if the difference between the aforementioned natural frequencies becomes larger than ±10%, the efficiency of power transmission becomes smaller than 10%, and there may be caused a negative effect such as prolongation of the time of power transmission or the like.

Incidentally, the natural frequency of the power transmitting unit 220 (the power receiving unit 110) means a vibration frequency in the case where an electric circuit (a resonant circuit) that constitutes the power transmitting unit 220 (the power receiving unit 110) freely vibrates. Incidentally, in the electric circuit (the resonant circuit) that constitutes the power transmitting unit 220 (the power receiving unit 110), the natural frequency at the time when the braking force or electric resistance is set substantially equal to zero is also referred to as the resonance frequency of the power transmitting unit 220 (the power receiving unit 110).

Figure 4:
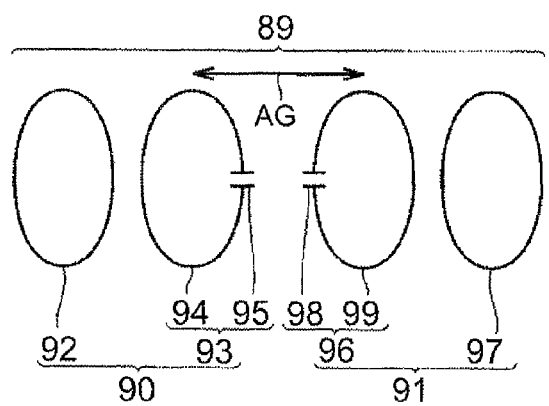
FIG. 4 is a diagram showing a simulation model of a power transmission system.
Figure 5:
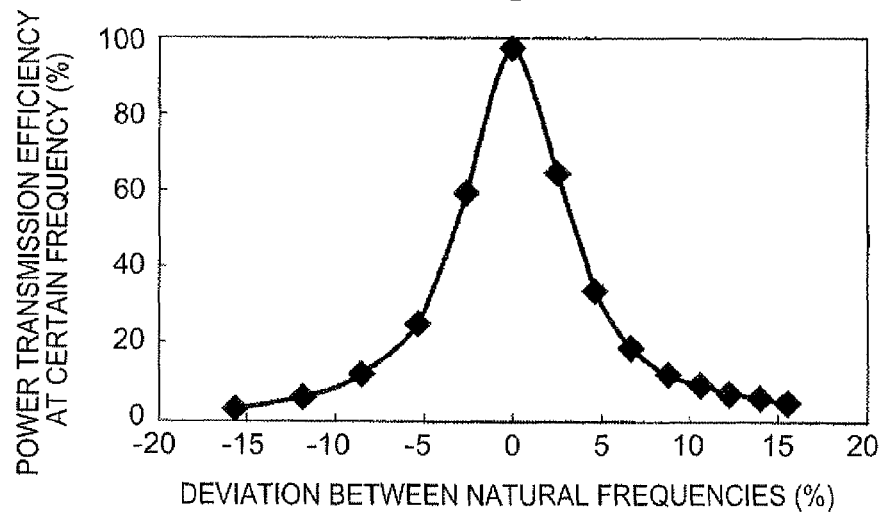
FIG. 5 is a diagram showing a relationship between the deviation between natural frequencies of a power transmitting unit and a power receiving unit, and the efficiency of power transmission.

A simulation result that is obtained by analyzing a relationship between the difference between the natural frequencies and the efficiency of power transmission will be described using FIGS. 4 and 5. FIG. 4 is a view showing a simulation model of the power transmission system. Besides, FIG. 5 is a view showing a relationship between the deviation between the natural frequencies of the power transmitting unit and the power receiving unit and the efficiency of power transmission.

Referring to FIG. 4, a power transmission system 89 is equipped with a power transmitting unit 90 and a power receiving unit 91. The power transmitting unit 90 includes a first coil 92 and a second coil 93. The second coil 93 includes a resonant coil 94, and a capacitor 95 that is provided in the resonant coil 94. The power receiving unit 91 is equipped with a third coil 96 and a fourth coil 97. The third coil 96 includes a resonant coil 99 and a capacitor 98 that is connected to this resonant coil 99.

It is assumed that the inductance of the resonant coil 94 is an inductance Lt, and that the capacitance of the capacitor 95 is a capacitance C1. Besides, it is assumed that the inductance of the resonant coil 99 is an inductance Lr, and that the capacitance of the capacitor 98 is a capacitance C2. If the respective parameters are thus set, a natural frequency f1 of the second coil 93 is expressed by an (1) shown below, and a natural frequency f2 of the third coil 96 is expressed by an (2) shown below.

$$f1 = 1/\{2\pi (Lt \times C1)^{1/2}\} \tag{1}$$

$$f2 = 1/\{2\pi (Lr \times C2)^{1/2}\} \tag{2}$$

It should be noted herein that FIG. 5 shows a relationship between the deviation between the natural frequencies of the second coil 93 and the third coil 96 and the efficiency of power transmission in the case where only the inductance Lt is changed with the inductance Lr and the capacitances C1 and C2 fixed. Incidentally, in this simulation, the relative positional relationship between the resonant coil 94 and the resonant coil 99 is fixed, and moreover, the frequency of the current supplied to the second coil 93 is constant.

In a graph shown in FIG. 5, the axis of abscissa represents the deviation between natural frequencies (%), and the axis of ordinate represents the efficiency of power transmission (%) at the time when the current has a certain frequency. The deviation between natural frequencies (%) is expressed by an (3) shown below.

(Deviation between natural frequencies)={(f1−f2)/f2}100(%)   (3)

As is apparent from FIG. 5, in the case where the deviation between natural frequencies (%) is 0%, the efficiency of power transmission is close to 100%. In the case where the deviation between natural frequencies (%) is ±5%, the efficiency of power transmission is about 40%. In the case where the deviation between natural frequencies (%) is ±10%, the efficiency of power transmission is about 10%. In the case where the deviation between natural frequencies (%) is ±15%, the efficiency of power transmission is about 5%. That is, it is apparent that the efficiency of power transmission can be enhanced to a practical level by setting the natural frequencies of the second coil 93 and the third coil 96 such that the absolute value of the deviation between natural frequencies (%) (the difference between natural frequencies) becomes equal to or smaller than 10% of the natural frequency of the third coil 96. Furthermore, it is more preferable to set the natural frequencies of the second coil 93 and the third coil 96 such that the absolute value of the deviation between natural frequencies (%) becomes equal to or smaller than 5% of the natural frequency of the third coil 96, because the efficiency of power transmission can further be enhanced. Incidentally, electromagnetic field analysis software (WAG (trademark): produced by JSOL Corporation) is adopted as simulation software.

Referring again to FIG. 3, the power transmitting unit 220 of the power transmitting device 200 and the power receiving unit 110 of the vehicle 100 exchange power with each other in a contactless manner, through at least one of a magnetic field that is formed between the power transmitting unit 220 and the power receiving unit 110 and vibrates at a specific frequency, and an electric field that is formed between the power transmitting unit 220 and the power receiving unit 110 and vibrates at a specific frequency. It is preferable that a power transmitting device coefficient x of the power transmitting unit 220 and the power receiving unit 110 be equal to or smaller than 0.1. By causing the power transmitting unit 220 and the power receiving unit 110 to resonate (sympathize) with each other through an electromagnetic field, power is transmitted from the power transmitting unit 220 to the power receiving unit 110.

Now, the magnetic field of the specific frequency, which is formed around the power transmitting unit 220, will be described. "The magnetic field of the specific frequency" is typically associated with the efficiency of power transmission and the frequency of the current that is supplied to the power transmitting unit 220. Thus, first of all, the relationship between the efficiency of power transmission and the frequency of the current supplied to the power transmitting unit 220 will be described. The efficiency of power transmission at the time when power is transmitted from the power transmitting unit 220 to the power receiving unit 110 changes depending on various factors such as the distance between the power transmitting unit 220 and the power receiving unit 110 and the like. For example, the natural frequency (the resonance frequency) of the power transmitting unit 220 and the power receiving unit 110 is denoted by f0, the frequency of the current supplied to the power transmitting unit 220 is denoted by f3, and the air gap between the power transmitting unit 220 and the power receiving unit 110 is defined as an air gap AG.

Figure 6:
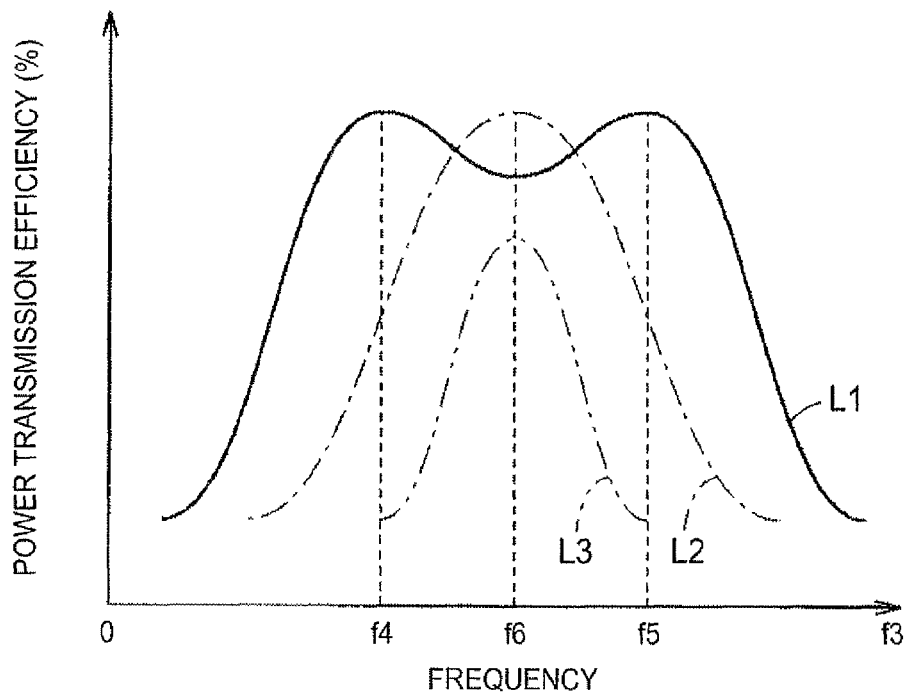
FIG. 6 is a graph showing a relationship between the efficiency of power transmission at a time when an air gap is changed with the natural frequency fixed, and the frequency of a current that is supplied to the power transmitting unit.

FIG. 6 is a graph showing a relationship between the efficiency of power transmission at the time when the air gap AG is changed with the natural frequency f0 fixed, and the frequency f3 of the current supplied to the power receiving unit 220. Referring to FIG. 6, the axis of abscissa represents the frequency f3 of the current supplied to the power transmitting unit 220, and the axis of ordinate represents the efficiency of power transmission (%). An efficiency curve L1 schematically shows a relationship between the efficiency of power transmission at the time when the air gap AG is small, and the frequency f3 of the current supplied to the power transmitting unit 220. As indicated by this efficiency curve L1, in the case where the air gap AG is small, the efficiency of power transmission reaches its peaks at frequencies f4 and f5 (f4<f5). When the air gap AG is increased, the two peaks at the time when the efficiency of power transmission is high change in such a manner as to approach each other. Then, as indicated by an efficiency curve L2, when the air gap AG is made larger than a predetermined distance, the efficiency of power transmission has only one peak. The efficiency of power transmission reaches its peak when the frequency of the current supplied to the power transmitting unit 220 is equal to the frequency f6. When the air gap AG is further increased from the state of the efficiency curve L2, the peak of the efficiency of power transmission decreases as indicated by an efficiency curve L3.

For example, the following methods are conceivable as methods for enhancing the efficiency of power transmission. As the first method, the capacitances of the capacitor 222 and the capacitor 112 are changed in accordance with the air gap AG with the frequency of the current supplied to the power transmitting unit 220 held constant, whereby the characteristic of the efficiency of power transmission is changed between the power transmitting unit 220 and the power receiving unit 110. More specifically, the capacitances of the capacitor 222 and the capacitor 112 are adjusted such that the efficiency of power transmission reaches its peak, with the frequency of the current supplied to the power transmitting unit 220 held constant. In this method, the frequency of the current flowing to the power transmitting unit 220 and the power receiving unit 110 is constant, regardless of the magnitude of the air gap AG.

Besides, as the second method, the frequency of the current supplied to the power transmitting unit 220 is adjusted on the basis of the magnitude of the air gap AG. For example, in the case where the characteristic of power transmission is indicated by the efficiency curve L1, a current with the frequency f4 or f5 is supplied to the power transmitting unit 220. In the case where the frequency characteristic is indicated by the efficiency curve L2 or L3, a current with the frequency f6 is supplied to the power transmitting unit 220. In this case, the frequency of the current flowing through the power transmitting unit 220 and the power receiving unit 110 is changed in accordance with the magnitude of the air gap AG.

In the first method, the frequency of the current flowing through the power transmitting unit 220 is a fixed constant frequency. In the second method, the frequency of the current flowing through the power transmitting unit 220 is the frequency that appropriately changes in accordance with the air gap AG. Due to the first method, the second method or the like, a current with a specific frequency, which is set such that the efficiency of power transmission becomes high, is supplied to the power transmitting unit 220. The current with the specific frequency flows through the power transmitting unit 220, whereby a magnetic field (an electromagnetic field) that vibrates at the specific frequency is formed around the power transmitting unit 220. The power receiving unit 110 receives power from the power transmitting unit 220 through the magnetic field that is formed between the power receiving unit 110 and the power transmitting unit 220 and vibrates at the specific frequency. Accordingly, "the magnetic field that vibrates at the specific frequency" is not absolutely required to be a magnetic field with a fixed frequency. Incidentally, in the foregoing example, the frequency of the current supplied to the power transmitting unit 220 is set focusing attention on the air gap AG. However, the efficiency of power transmission also changes depending on other factors such as horizontal displacement of the power transmitting unit 220 and the power receiving unit 110 and the like. In some cases, the frequency of the current supplied to the power transmitting unit 220 is adjusted on the basis of these other factors.

Incidentally, in the foregoing description, the example in which a helical coil is adopted as the resonant coil has been described. However, in the case where an antenna such as a meander line etc., or the like is adopted as the resonant coil, the current with the specific frequency flows through the power transmitting unit 220, whereby an electric field with the specific frequency is formed around the power transmitting unit 220. Then, through this electric field, power is transmitted between the power transmitting unit 220 and the power receiving unit 110.

In this power transmission system, the efficiency of power transmission and power reception is enhanced through the use of a near field (an evanescent field) of the electromagnetic field in which "an electrostatic magnetic field" is dominant.

Figure 7:
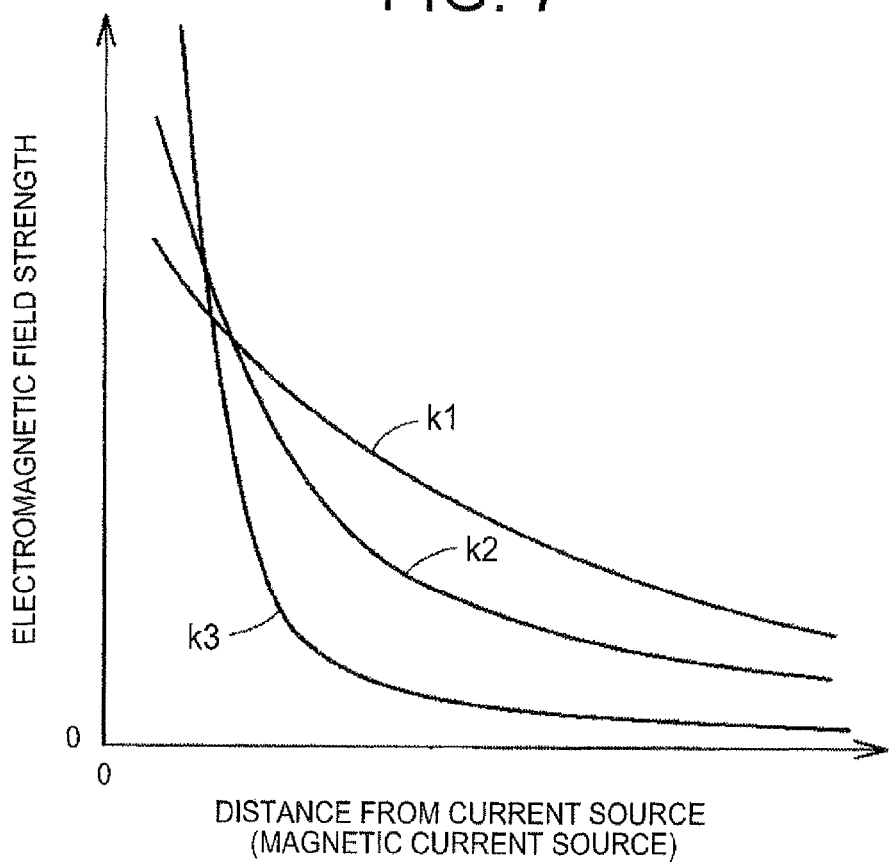
FIG. 7 is a view showing a relationship between the distance from a current source (a magnetic current source) and the strength of an electromagnetic field.

FIG. 7 is a view showing a relationship between the distance from a current source (a magnetic current source) and the strength of an electromagnetic field. Referring to FIG. 7, the electromagnetic field is constituted of three components. A curve k1 is a component that is in inverse proportion to the distance from a wave source, and is referred to as "a radiation electromagnetic field". A curve k2 is a component that is in inverse proportion to the square of the distance from the wave source, and is referred to as "an induction electromagnetic field". Besides, a curve k3 is a component that is in inverse proportion to the cube of the distance from the wave source, and is referred to as "a static electromagnetic field". Incidentally, if the wavelength of the electromagnetic field is denoted by "$\lambda$", the distance at which the strengths of "the radiation electromagnetic field", "the induction electromagnetic field", and "the static electromagnetic field" are approximately equal to one another can be expressed as $\lambda/2\pi$.

"The static electromagnetic field" is a region in which the strength of electromagnetic waves rapidly decreases as the distance from the wave source decreases. In the power transfer system according to this embodiment of the invention, the transmission of energy (power) is carried out with the aid of a near field (an evanescent field) in which this "static electromagnetic field" is dominant. That is, in the near field in which "the static electromagnetic field" is dominant, the power transmitting unit 220 and the power receiving unit 110 (e.g., a pair of LC resonant coils), which have natural frequencies that are close to each other, are caused to resonate with each other, whereby energy (power) is transmitted from the power transmitting unit 220 on one side to the power receiving unit 110 on the other side. This "static electromagnetic field" does not propagate energy over a long distance. Therefore, the resonance method makes it possible to transmit power with smaller energy loss in comparison with electromagnetic waves that transmit energy (power) by "the radiation electromagnetic field" that propagates energy over a long distance.

As described hitherto, in this power transmission system, the power transmitting unit 220 and the power receiving unit 110 are caused to resonate (sympathize) with each other by the electromagnetic field, whereby power is transmitted between the power transmitting unit 220 and the power receiving unit 110 in a contactless manner. In addition, the coupling coefficient ($\kappa$) of the power transmitting unit 220 and the power receiving unit 110 is, for example, equal to or smaller than about 0.3, and preferably equal to or smaller than 0.1. As a matter of course, a range from about 0.1 to about 0.3 can also be adopted as the coupling coefficient ($\kappa$). The coupling coefficient ($\kappa$) is not limited to such values, but can assume various values enabling good power transmission.

Incidentally, the foregoing coupling of the power transmitting unit 220 and the power receiving unit 110 in power transmission is referred to as, for example, "magnetic resonance coupling", "magnetic field resonance coupling", "electromagnetic field resonance coupling", "electric field resonance coupling", or the like. "Electromagnetic field resonance coupling" means coupling that includes all of "magnetic resonance coupling", "magnetic field resonance coupling", and "electric field resonance coupling".

In the case where the power transmitting unit 220 and the power receiving unit 110 are formed by coils as described above, the power transmitting unit 220 and the power receiving unit 110 are coupled to each other mainly by a magnetic field, and "magnetic resonance coupling" or "magnetic field resonance coupling" is formed. Incidentally, antennae such as meander lines or the like can also be adopted as the power transmitting unit 220 and the power receiving unit 110. In this case, the power transmitting unit 220 and the power receiving unit 110 are coupled to each other mainly by an electric field, and "electric field resonance coupling" is formed.

Next, authentication control between the vehicle and the power transmitting device will be described. As described above, in the contactless power transfer system, power transmission is carried out in a contactless manner. In general, therefore, the exchange of various pieces of information between the power transmitting device and the vehicle is also carried out through radio communication by the communication unit. However, in communication using the communication unit, the communicable area is designed to be relatively wide, in order to notify a plurality of vehicles that the power transmitting device is available, or in order for the vehicle to search an available one of a plurality of power transmitting devices. Due to this wide communicable area, a vehicle that is recognized as a power supply target by the power transmitting device through communication may not coincide with a vehicle that is parked in a parking space where the power transmitting device is installed so as to be actually supplied with power. More specifically, a vehicle that is parked in an adjacent parking space where another power transmitting device is installed may be recognized as a vehicle to be supplied with power.

If this state arises, the specification and state of change of the vehicle cannot be appropriately grasped. Therefore, the charge operation may not be correctly performed, or the instruments may be damaged or deteriorated through overcharge or the like.

Alternatively, in the case where charging is suspended for some reason and the vehicle is moved after a user starts the operation of parking the vehicle in the parking space where the power transmitting device is installed so as to carry out charging, recognition (pairing) may be unnecessarily continued between the vehicle and the power transmitting device, and the number of opportunities at which other vehicles utilize the power transmitting device may decrease.

Accordingly, in the contactless power transfer system, it is important to ensure that mutual pairing between the power transmitting device and the vehicle and the timings for setting/canceling the mutual pairing are correct.

For this purpose, a method of enhancing the reliability of pairing by using also other communication means having a narrower communicable area than the communication unit, such as the RFID, as in the configuration of FIG. 1 or FIG. 2 has been reviewed.

In communication means having a narrow communication range such as the RFID, it is impossible to establish communication with a vehicle that is parked in an adjacent parking space. Therefore, erroneous pairing can be prevented.

On the other hand, communication may be temporarily interrupted in some cases due to the influence of a radio wave condition, ambient noise and the like, as a result of a narrow communication area. In such cases, pairing may be erroneously canceled.

Then, in this embodiment of the invention, in the contactless power transfer system that performs pairing by using narrow area communication such as the RFID in combination with wide area communication by the communication unit, authentication control for determining, in consideration of the power receiving state of the vehicle, whether or not pairing should be canceled is performed.

Figure 8:
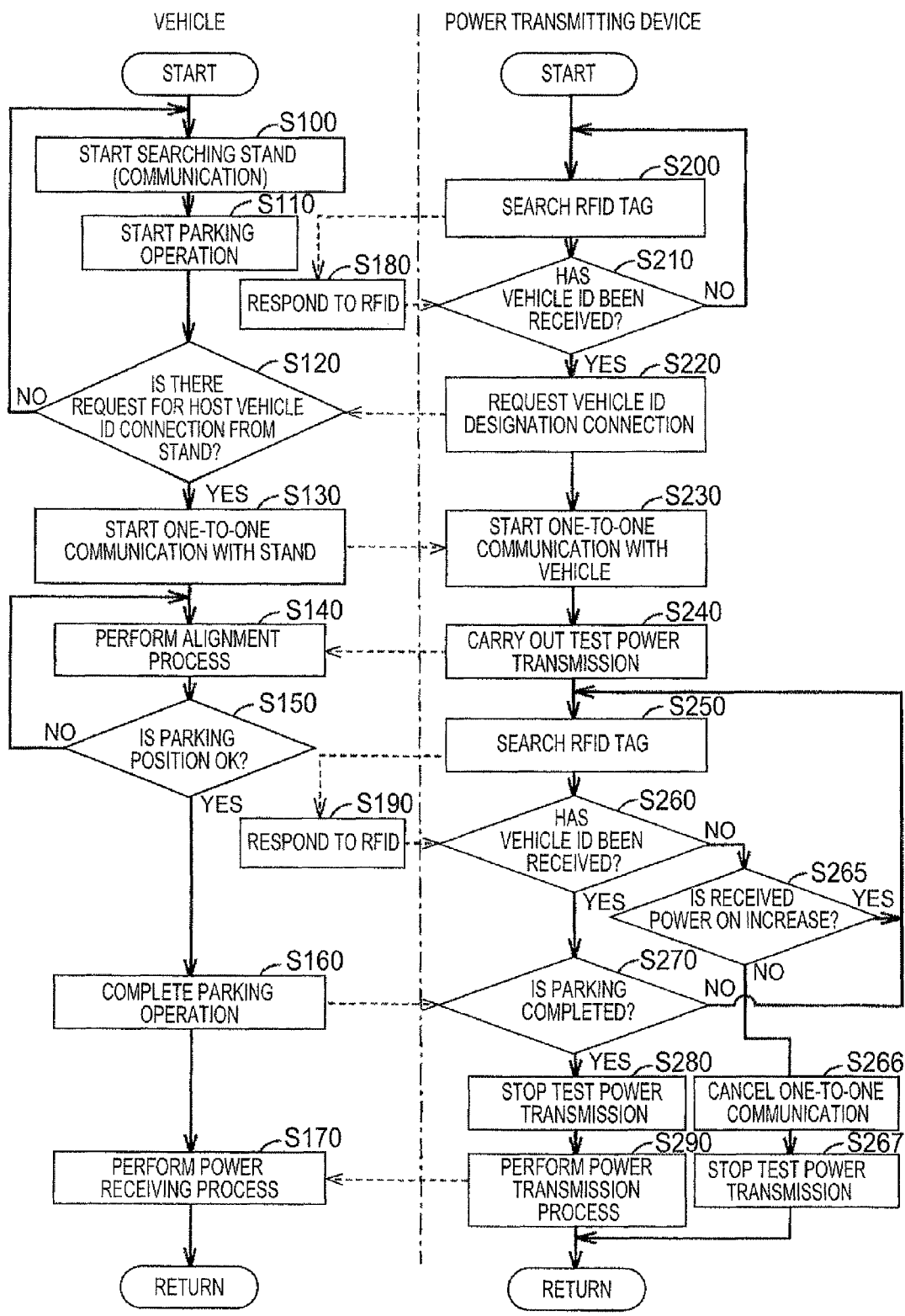
FIG. 8 is a flowchart for illustrating an authentication control process that is performed by the power transmitting device and the vehicle in the foregoing first embodiment of the invention.

FIG. 8 is a flowchart for illustrating an authentication control process that is performed by the power transmitting device 200 and the vehicle 100 in the first embodiment of the invention. Respective steps in the flowchart shown in FIG. 8 and a flowchart shown in FIG. 10, which will be described later, are realized when programs that are stored in advance mainly in the vehicle ECU 300 and the power transmitting ECU 240 are called up from a main routine and executed on a predetermined cycle or upon the fulfillment of a predetermined condition. Alternatively, one or some of the steps can also be realized by structuring a dedicated piece of hardware (an electronic circuit). Incidentally, in FIG. 8, steps S180 and S190 in the vehicle 100 are processed in the RFID 155.

Referring to FIGS. 1 and 8, the process in the vehicle 100 will be described first. In step (hereinafter abbreviated as S) 100, the vehicle 100 starts searching a power transmitting device (hereinafter referred to also as "a charging stand" or "a stand") through radio communication using the communication unit 160. More specifically, the vehicle 100 successively sends response request information including a vehicle ID for identifying the vehicle, for example, at intervals of a predetermined time, without specifying a partner stand.

Then, the vehicle 100 starts an operation of parking in a parking space with a specific stand in order to carry out contactless charging, through the operation by a user (S110). During the performance of this parking operation, vehicle information that is stored in the RFID 155 on the vehicle 100 side is read by the RFID reader 270 of the power transmitting device 200 (S180). Incidentally, as will be described later, in the power transmitting device 200, vehicle information sent from the vehicle 100 through radio transmission in S100 corresponds to vehicle information read from the RFID 155. If both the pieces of vehicle information are recognized to represent the same vehicle, radio transmission (polling) of connection request information specifying a partner vehicle is carried out by adding, for example, a vehicle ID of the vehicle and a stand ID of a host stand (S210, S220).

The vehicle 100 determines in S120 whether or not connection request information specifying the host vehicle has been received from the stand.

If connection request information has not been received (NO in S120), the processing procedure is returned to S100, and the vehicle 100 continues the parking operation while sending response request information to the stand.

If connection request information has been received (YES in S120), the vehicle 100 determines that the power supply target vehicle is recognized to be the host vehicle in the stand that is provided in the parking space in which the vehicle 100 is currently parked. Then in S130, the vehicle 100 starts radio communication with the partner stand specified. Thus, one-to-one communication between the power transmitting device 200 and the vehicle 100 is started, so that pairing is completed.

After that, in S140, the vehicle 100 performs a process of aligning the power transmitting unit 220 of the power transmitting device 200 with the power receiving unit 110 of the vehicle 100, using a power that is supplied from the stand through test power transmission.

It should be noted herein that test power transmission means that the power transmitting device 200 transmits, for the sake of this alignment process, a power that is smaller than a power actually used in charging the electrical storage device 190. When the distance between the power transmitting unit 220 and the power receiving unit 110 changes, the impedance between the power transmitting unit 220 and the power receiving unit 110 changes correspondingly, and hence, the received power (i.e., the efficiency of power transmission) that is received by the vehicle 100 changes. Then, as the positional relationship (the distance) between the power transmitting unit 220 and the power receiving unit 110 approaches an optimal distance in terms of designing, the received power (the efficiency of power transmission) in the vehicle 100 increases. Thus, the power transmitting unit 220 can be aligned with the power receiving unit 110 by monitoring the power received by the vehicle 100 during the performance of the parking operation.

In S150, the vehicle 100 determines, on the basis of the received power, whether or not the parking position has reached an appropriate position. For example, if the received power or the efficiency of power transmission has exceeded a predetermined reference value, it is determined that the parking position is appropriate.

If the parking position is not appropriate (NO in S150), the processing procedure is returned to S140, and the parking operation is continued to follow through on the alignment process.

Incidentally, even while the alignment process is performed, information on the RFID 155 is successively read out by the RFID reader 270 of the power transmitting device 200 (S190).

On the other hand, if the parking position is appropriate (YES in S150), the vehicle 100 urges the user to end the parking operation by, for example, a display device (not shown) that employs a lamp and a display panel, and/or a warning device (not shown) that employs a chime and a buzzer.

Then, if the user performs an operation indicating the completion of the parking operation, the vehicle 100 sends parking completion information to the power transmitting device 200 (S160). Incidentally, the operation indicating the completion of the parking operation includes, for example, that a shift lever has been set in a parking position, that a parking brake has been operated, that an ignition switch has been set off, and the like.

After that, the processing process is advanced to S170, and the process of receiving the power that is supplied from the power transmitting unit 220 is performed.

Next, the process in the power transmitting device 200 will be described. Upon receiving response request information from the vehicle, the power transmitting device 200 starts searching the RFID tag provided in the vehicle 100 by the RFID reader 270, in S200. As described above, upon receiving the power from the RFID reader 270, the RFID 155 of the vehicle 100 sends vehicle information stored therein (S180).

Then, the power transmitting device 200 determines in S210 whether or not a vehicle ID corresponding to vehicle information included in the response request information has been received from the RFID 155.

If the corresponding vehicle ID has not been received (NO in S210), the processing process is returned to S200, and the power transmitting device 200 continues to search the RFID.

If the corresponding vehicle ID has been received (YES in S210), the processing procedure is advanced to S220, and the power transmitting device 200 sends connection request information to which the stand ID of the host stand and the received vehicle ID has been assigned, through radio communication. If the relevant vehicle receives this connection request information, information indicating that one-to-one communication is started is sent from the vehicle through radio communication (S130). Thus, one-to-one communication is established between the vehicle 100 and the power transmitting device 200, and pairing is completed (S230).

After that, the power transmitting device 200 starts test power transmission to support the alignment process of the vehicle 100 (S240). Until the alignment process of the vehicle 100 is completed, the power transmitting device 200 continues to read out vehicle information from the RFID 155 of the vehicle 100 (S250).

If the vehicle ID is correctly received from the RFID 155 (YES in S260) and the parking operation is completed (YES in S270), the power transmitting device 200 stops test power transmission (S280), and performs a full-fledged power transmitting process for charging the electrical storage device 190 (S290).

If the parking operation is not completed (NO in S270), the processing procedure is returned to S250, and the power transmitting device 200 continues to read out vehicle information from the RFID 155.

On the other hand, if the vehicle ID fails to be correctly received from the RFID 155 during the alignment process of the vehicle 100 (NO in S260), the processing procedure is advanced to S265, and the power transmitting device 200 determines whether or not the power received by the vehicle 100 is on the increase or equal to or larger than a predetermined level. This received power may be, for example, included in information that is sequentially sent from the vehicle 100 to the power transmitting device 200 through radio communication, or obtained through calculation by detecting a reflected power or the like in the power transmitting device 200. Incidentally, the vehicle ID instantaneously fails to be correctly received from the RFID 155 in some cases, due to a radio wave condition or the like. Therefore, even in the case where the vehicle ID is not correctly received, pairing may be maintained until the lapse of a predetermined time, for example, several tens of seconds, instead of immediately making a determination on the basis of changes in the received power.

If the received power is on the increase or equal to or larger than the predetermined level (YES in S265), the power transmitting device 200 determines that the signal from the RFID 155 cannot be temporarily received due to the reflection of radio waves, external noise or the like, and that the vehicle 100 has been continuing the parking operation. Then, the power transmitting device 200 returns the processing procedure to S250, and continues to read out vehicle information from the RFID 155 while maintaining pairing.

On the other hand, if the received power has decreased below the predetermined level (NO in S265), the power transmitting device 200 determines that the user has suspended the parking operation for some reason and moved the vehicle from the parking space.

In this case, in order to cancel pairing with the vehicle 100, the power transmitting device 200 stops one-to-one communication with the vehicle 100 (S266), and stops test power transmission (S267). After that, the processing procedure is returned to the initial step, and the search for a vehicle is started anew.

The control is performed in accordance with the foregoing process. Thus, in the contactless power transfer system, pairing between the vehicle and the power transmitting device can be appropriately carried out using the information obtained through radio communication and the information obtained through the RFID. In particular, in consideration of the information obtained through the RFID and the power receiving state in the vehicle, it is possible to determine whether the information on the RFID has temporarily become unable to be read due to an external factor, or the user has purposely moved the vehicle. It is therefore possible to restrain pairing between the vehicle and the power transmitting device from being unintentionally canceled, or to restrain pairing between the vehicle and the power transmitting device from being unnecessarily continued. As a result, the reliability of pairing can be enhanced.

Incidentally, in the foregoing first embodiment of the invention, the case where it is determined in step S265 whether or not the parking operation of the vehicle is underway (i.e., whether or not the power receiving unit is approaching the power transmitting unit), from changes in the received power in the vehicle, if the vehicle ID from the RFID fails to be correctly received has been described as an example. However, the determination as to whether or not the parking operation is underway can also be configured otherwise. In the foregoing example, a determination on the distance between the power transmitting unit and the power receiving unit is indirectly made from the received power. For example, however, it is also appropriate to calculate a distance between the power transmitting unit in a parking area and the power receiving unit of the vehicle through the use of a distance detector and/or a camera or the like, and determine, on the basis of changes in the calculated distance, whether or not the parking operation of the vehicle is underway.

Next, the second embodiment of the invention will be described. In the first embodiment of the invention, the case where the RFID is provided on the vehicle side, the RFID reader is provided on the power transmitting device side, and authentication control is performed by the power transmitting device has been described.

In the second embodiment of the invention, on the contrary, a case where an RFID is provided on a power transmitting device side, an RFID reader is provided on a vehicle side, and authentication control is performed by the vehicle will be described.

Figure 9:
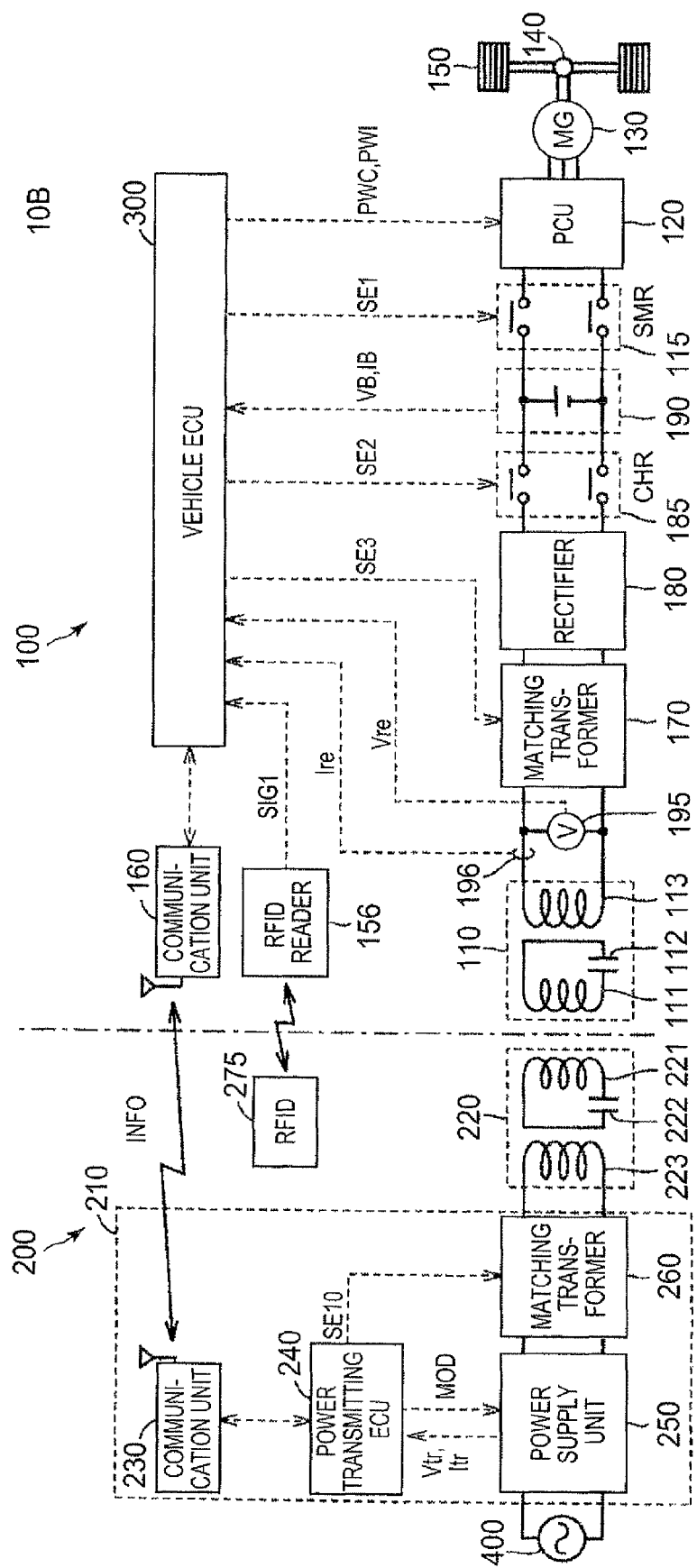
FIG. 9 is an overall block diagram of a contactless power transfer system according to the second embodiment of the invention.

FIG. 9 is an overall block diagram of a contactless power transfer system 10B according to the second embodiment of the invention. In FIG. 9, in the contactless power transfer system 10 according to the first embodiment of the invention, which is shown in FIG. 1, the RFID reader 270 on the power transmitting device 200 side is replaced with an RFID 275, and the RFID 155 on the vehicle 100 side is replaced with an RFID reader 156. In FIG. 9, the description of the same elements as in FIG. 1 will not be repeated.

Referring to FIG. 9, the RFID 275 on the power transmitting device 200 side is similar in configuration to the RFID 155 on the vehicle side in the first embodiment of the invention, and is arranged on, for example, a lateral wall surface or the like of a parking space where the vehicle 100 is parked.

The RFID reader 156 on the vehicle 100 side is provided, for example, at an end of a front face of the vehicle 100, at an end of a rear face of the vehicle 100, or on a lateral face of the vehicle 100, supplies power to the RFID 275 in a contactless manner, and receives information on the power transmitting device 200, which is sent from the RFID 275 in accordance therewith. The RFID reader 156 sends to the vehicle ECU 300 information SIG1 received from the RFID 275.

As is the case with authentication control that is performed by the power transmitting ECU 240 in the first embodiment of the invention, the vehicle ECU 300 authenticates a power transmitting device on the basis of information on the power transmitting device 200 from the RFID reader 156, and information on the power transmitting device 200 that has been received by the communication unit 160.

FIG. 10 is a flowchart for illustrating an authentication control process that is performed by the power transmitting device 200 and the vehicle 100 in the second embodiment of the invention.

Referring to FIGS. 9 and 10, the process of the power transmitting device 200 will be described first. In S300, the power transmitting device 200 starts searching a vehicle through radio communication using the communication unit 230. More specifically, the power transmitting device 200 successively sends response request information including a stand ID for identifying a stand, for example, at intervals of a predetermined time, without specifying a partner vehicle.

Then, the user performs a parking operation in a parking space having the stand, and stand information stored in the RFID 275 of the power transmitting device 200 is read by the RFID reader 156 on the vehicle 100 side (S370). Incidentally, as will be described later, in the vehicle 100, stand information sent from the power transmitting device 200 through radio transmission in S300 corresponds to stand information read from the RFID 275. If both the pieces of information are recognized to represent the same stand, the radio transmission (polling) of connection request information that specifies a partner stand by, for example, adding a stand ID of the stand and a vehicle ID of the host vehicle is carried out (S420, S430).

In S310, the power transmitting device 200 determines whether or not the connection request information specifying the host stand has been received from the vehicle.

If the connection request information has not been received (NO in S310), the processing procedure is returned to S300, and the power transmitting device 200 continues to send response request information to the vehicle.

If the connection request information has been received (YES in S310), the power transmitting device 200 determines, in a vehicle that is currently in the process of performing the parking operation in the parking space, that the host stand is recognized to be a stand to supply power to the vehicle. Then in S320, the power transmitting device 200 starts radio communication with the partner vehicle specified. Thus, one-to-one communication between the power transmitting device 200 and the vehicle 100 is started, and pairing is completed.

Then, until the parking operation of the vehicle 100 is completed, the power transmitting device 200 carries out test power transmission to support the alignment of the power transmitting unit 220 with the power receiving unit 110 (S330).

If the parking operation of the vehicle 100 is not completed (NO in S340), the processing procedure is returned to S340, and test power transmission is continued. On the other hand, if the parking operation of the vehicle 100 is completed (YES in S340), the power transmitting device 200 stops test power transmission (S350), and starts full-fledged power transmission for charging the electrical storage device 190 (S360).

Incidentally, while test power transmission is carried out, the vehicle 100 continues to read out the RFID 275 (S380).

Next, the process in the vehicle 100 will be described. If a parking operation in a parking space where contactless power transfer is possible is started through the operation by the user (S400), the vehicle 100 conducts a search for the RFID 275 of a stand by the RFID reader 156 (S410). In the power transmitting device 200, if a power from the RFID reader 156 is received, stand information stored inside the RFID 275 is sent (S370).

Then in S420, the vehicle 100 determines whether or not a stand ID corresponding to stand information included in response request information has been received from the RFID 275.

If the corresponding stand ID has not been received (NO in S420), the processing procedure is returned to S400, and the vehicle 100 continues the search for the RFID.

If the corresponding stand ID is received (YES in S420), the processing procedure is advanced to S430, and the vehicle 100 sends connection request information to which the vehicle ID of the host vehicle and the received stand ID are assigned, through radio communication. If this connection request information is received by the relevant stand, information indicating that one-to-one communication is started is sent from the stand through radio communication (S310). Thus, one-to-one communication between the vehicle 100 and the power transmitting device 200 is established, and pairing is completed (S440).

Then, in response to the start of test power transmission from the power transmitting device 200 (S330), the vehicle 100 performs a process of aligning the power transmitting unit 220 with the power receiving unit 110 (S450).

Until the alignment process is completed, the vehicle 100 continuously reads out stand information from the RFID 275 of the power transmitting device 200 (S460).

If the stand ID is correctly received from the RFID 275 (YES in S470) and it is recognized from a power receiving state that the parking position is appropriate (YES in S480), the vehicle 100 sends parking completion information to the power transmitting device 200 as a result of the parking completion operation by the user (S490). Then, if a full-fledged power is supplied from the power transmitting device 200 in response to this, the vehicle 100 charges the electrical storage device 190 with the received power (S500).

If the parking position is not appropriate (NO in S480), the processing procedure is returned to S460, and the vehicle 100 continues to read out stand information from the RFID 275 while performing the alignment process.

On the other hand, if a stand ID fails to be correctly received from the RFID 275 during the alignment process of the vehicle 100 (NO in S470), the processing procedure is advanced to S475, and the vehicle 100 determines whether or not the received power is on the increase or equal to or larger than a predetermined level. Incidentally, in this case, as is the case with the first embodiment of the invention, even when the stand ID fails to be correctly received from the RFID 275, pairing may be maintained until a predetermined time elapses.

If the received power is on the increase or equal to or larger than the predetermined level (YES in S475), the vehicle 100 determines that a signal from the RFID 275 cannot be received temporarily due to the reflection of radio waves, external noise, and the like. Then, the power transmitting device 200 returns the processing procedure to S460, and continues to read out stand information from the RFID 275 while maintaining pairing.

On the other hand, if the received power has decreased below a predetermined level (NO in S475), the vehicle 100 determines that the user has suspended the parking operation and moved the vehicle from the parking space.

In this case, in order to cancel paring with the power transmitting device 200, the vehicle 100 stops one-to-one communication with the power transmitting device 200 (S476), and outputs to the power transmitting device 200 a command to stop test power transmission (S477). Although not shown in FIG. 10, in response to this, the power transmitting device 200 stops communication with the vehicle 100 and test power transmission.

As described above, even in the configuration in which the RFID is provided on the power transmitting device side and the RFD reader is provided on the vehicle side in the contactless power transfer system, pairing between the vehicle and the power transmitting device can be appropriately carried out.

Incidentally, in the case of the second embodiment of the invention as well, if the stand ID fails to be correctly received from the RFID in S475, it is determined from changes in the received power whether or not the parking operation is underway. However, as is the case with the description in the first embodiment of the invention, it is also appropriate to determine, on the basis of a distance calculated through the use of a distance detector and/or a camera or the like, whether or not the parking operation is underway.

While the invention has been described with reference to the example embodiments thereof, it is to be understood that the invention is not limited to the described example embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A power transmitting device that supplies power to a vehicle, comprising:
    a power transmitting unit configured to supply power to the vehicle in a contactless manner;
    a readout unit configured to read out, in a contactless manner, information stored in advance in an ID tag provided in the vehicle;
    a communication unit configured to exchange information with the vehicle through radio communication; and
    a control device configured to control supply of power to the vehicle, the control device being configured to recognize that the vehicle is a vehicle to be supplied with power from the control device, if vehicle information indicated by information from the ID tag corresponds to vehicle information indicated by information received by the communication unit,
    wherein the control device is configured to refrain from recognizing that the vehicle is a vehicle to be supplied with power, if information is unable to be read out from the ID tag after recognizing that the vehicle is a vehicle to be supplied with power from the control device.

2. The power transmitting device according to claim 1, wherein
    the control device is configured to keep recognizing that the vehicle is a vehicle to be supplied with power, if at least one of a condition that received power in the vehicle be on an increase and a condition that the received power be equal to or larger than a predetermined level is fulfilled even in a case where information is unable to be read out from the ID tag.

3. The power transmitting device according to claim 1, wherein
    the control device is configured to keep recognizing that the vehicle is a vehicle to be supplied with power, if at least one of a condition that a distance between the power transmitting unit and the vehicle be on a decrease and a condition that the distance be shorter than a predetermined distance is fulfilled even in a case where information is unable to be read out from the ID tag.

4. The power transmitting device according to claim 1, wherein
    the control device is configured to keep recognizing that the vehicle is a vehicle to be supplied with power, until a predetermined time elapses even in a case where information is unable to be read out from the ID tag.

5. The power transmitting device according to claim 1, wherein
    a communicable distance between the readout unit and the ID tag is shorter than a communicable distance of the communication unit based on radio communication.

6. The power transmitting device according to claim 1, wherein
    the control device is configured to carry out radio communication with a receiving party not specified by the communication unit if the vehicle to be supplied with power is not recognized, and to carry out radio communication with a receiving party specified by the communication unit if the vehicle to be supplied with power is recognized.

7. The power transmitting device according to claim 1, wherein
    the power transmitting device supplies the vehicle with power less than power used to charge an electrical storage device, the electrical storage being mounted on the vehicle, so as to support alignment of the vehicle with the power transmitting unit when the vehicle performs a parking operation in which the vehicle is moved to be a position above the power transmitting unit, and
    the vehicle makes a determination on a position for parking on a basis of a state of power reception from the power transmitting device.

8. The power transmitting device according to claim 1, wherein
    the vehicle includes a power receiving unit that receives power in a contactless manner, and
    a difference between a natural frequency of the power transmitting unit and a natural frequency of the power receiving unit is equal to or smaller than ±10% of one of the natural frequency of the power transmitting unit and the natural frequency of the power receiving unit.

9. The power transmitting device according to claim 1, wherein
    the vehicle includes a power receiving unit that receives power in a contactless manner, and
    a coupling coefficient of the power transmitting unit and the power receiving unit is equal to or smaller than 0.1.

10. The power transmitting device according to claim 1, wherein
    the vehicle includes a power receiving unit configured to receive power in a contactless manner, and
    the power receiving unit is configured to receive power from the power transmitting unit through at least one of a magnetic field and an electric field, the magnetic field being between the power receiving unit and the power transmitting unit, the magnetic field vibrating at a specific frequency, the electric field that being between the power receiving unit and the power transmitting unit, and the electric field vibrating at a specific frequency.

11. A contactless power transfer system that supplies power in a contactless manner, comprising:
   a vehicle including an ID tag in which information on the vehicle is stored in advance;
   a power transmitting device including a readout unit configured to read out information stored in advance in the ID tag in a contactless manner, the power transmitting device being configured to mutually exchange information with the vehicle through radio communication; and
   a control device configured to control supply of power from the power transmitting device to the vehicle, the control device being configured to recognize that the vehicle is a vehicle to be supplied with power from the power transmitting device if vehicle information indicated by information from the ID tag corresponds to vehicle information indicated by information received through radio communication,
   wherein the control device is configured to refrain from recognizing that the vehicle is a vehicle to be supplied with power, if information is unable to be read out from the ID tag after recognizing that the vehicle is a vehicle to be supplied with power from the control device.

12. A vehicle that receives power from a power transmitting device, comprising:
   a power receiving unit configured to receive power from the power transmitting device in a contactless manner;
   an electrical storage device configured to store power received by the power receiving unit;
   a readout unit configured to read out information stored in advance in an ID tag that is provided in the power transmitting device;
   a communication unit configured to exchange information with the power transmitting device through radio communication; and
   a control device configured to control charging of the electrical storage device with power received from the power transmitting device, the control device being configured to recognize that the power transmitting device is a power transmitting device to supply power to the vehicle, if information on the power transmitting device, the information being indicated by information from the ID tag, corresponds to information on the power transmitting device, the information being indicated by information received by the communication unit,
   wherein the control device is configured to refrain from recognizing that the vehicle is a vehicle to be supplied with power, if information is unable to be read out from the ID tag after recognizing that the vehicle is a vehicle to be supplied with power from the control device.

13. A contactless power transfer system that supplies power in a contactless manner, comprising:
   a power transmitting device including an ID tag in which information on the power transmitting device is stored in advance;
   a vehicle including a readout unit configured to read out, in a contactless manner, information stored in advance in the ID tag, the vehicle being configured to mutually exchange information with the power transmitting device through radio communication; and
   a control device configured to control supply of power from the power transmitting device to the vehicle, the control device being configured to recognize that the power transmitting device is a power transmitting device to supply power to the vehicle, if information on the power transmitting device, the information being indicated by information from the ID tag, corresponds to information on the power transmitting device, the information being indicated by information received through radio communication,
   wherein the control device is configured to refrain from recognizing that the vehicle is a vehicle to be supplied with power, if information is unable to be read out from the ID tag after recognizing that the vehicle is a vehicle to be supplied with power from the control device.

* * * * *